(12) United States Patent
Zhang

(10) Patent No.: US 11,184,314 B2
(45) Date of Patent: Nov. 23, 2021

(54) METHOD AND APPARATUS FOR PROMPTING MESSAGE READING STATE, AND ELECTRONIC DEVICE

(71) Applicant: TIANJIN BYTEDANCE TECHNOLOGY CO., LTD., Tianjin (CN)

(72) Inventor: Xu Zhang, Beijing (CN)

(73) Assignee: TIANJIN BYTEDANCE TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 17/245,348

(22) Filed: Apr. 30, 2021

(65) Prior Publication Data

US 2021/0250322 A1 Aug. 12, 2021

Related U.S. Application Data

(63) Continuation of application No. PCT/CN2019/126362, filed on Dec. 18, 2019.

(30) Foreign Application Priority Data

Dec. 29, 2018 (CN) .......................... 201811634964.6

(51) Int. Cl.
*G06F 15/16* (2006.01)
*H04L 12/58* (2006.01)
(Continued)

(52) U.S. Cl.
CPC .......... *H04L 51/30* (2013.01); *G06F 3/0482* (2013.01); *G06F 3/0484* (2013.01); *G06Q 50/01* (2013.01);
(Continued)

(58) Field of Classification Search
CPC ........ H04L 51/30; H04L 51/04; H04L 51/16; H04L 51/32; G06F 3/0482
(Continued)

(56) References Cited

U.S. PATENT DOCUMENTS 9,591,089 B2 * 3/2017 Herger ................ G06F 16/9535
9,946,593 B2 * 4/2018 Bishop ................ G06F 11/1438
(Continued)

FOREIGN PATENT DOCUMENTS

CN 104077183 A 10/2014
CN 105323147 A 2/2016
(Continued)

OTHER PUBLICATIONS

International Search Report for International Patent Application No. PCT/CN2019/126362, dated Mar. 18, 2020, 5 pages with English Translation.
(Continued)

*Primary Examiner* — Khanh Q Dinh

(57) ABSTRACT

The present disclosure provides a method and apparatus for prompting a reading state of a message, and an electronic device. The method includes: displaying, when a message having a reading state to be identified is sent in a conversation window including a plurality of users, a reading state prompt pattern corresponding to the message in the conversation window; determining current reading states of respective ones of the plurality of users for the message; counting a current number of users who have read the message based on the reading states; and controlling the reading state prompt pattern to be displayed in a state that reflects the current number of users who have read the message.

9 Claims, 7 Drawing Sheets

(51) Int. Cl.
*G06Q 50/00* (2012.01)
*G06F 3/0482* (2013.01)
*G06F 3/0484* (2013.01)

(52) U.S. Cl.
CPC .............. *H04L 51/04* (2013.01); *H04L 51/16* (2013.01); *H04L 51/32* (2013.01)

(58) Field of Classification Search
USPC .......................... 709/220, 224, 226, 228, 232
See application file for complete search history.

(56) References Cited

U.S. PATENT DOCUMENTS

| | | | | |
|---|---|---|---|---|
| 9,965,330 | B2* | 5/2018 | Bishop | G06F 3/067 |
| 10,324,773 | B2* | 6/2019 | Wing | G06F 1/30 |
| 2010/0266740 | A1* | 10/2010 | Van Den Aker | A23G 9/045 |
| | | | | 426/433 |
| 2015/0201074 | A1 | 7/2015 | Swanburg et al. | |
| 2015/0281155 | A1* | 10/2015 | Cue | G06F 3/04883 |
| | | | | 715/752 |
| 2017/0024095 | A1* | 1/2017 | Glasgow | G06F 16/71 |
| 2017/0364599 | A1* | 12/2017 | Ohanyerenwa | G06F 16/435 |
| 2017/0372222 | A1* | 12/2017 | Kollia | G06N 20/00 |
| 2018/0253335 | A1* | 9/2018 | Bishop | G06F 9/505 |

FOREIGN PATENT DOCUMENTS

| | | | |
|---|---|---|---|
| CN | 105743775 | A | 7/2016 |
| CN | 106341313 | A | 1/2017 |
| CN | 106713121 | A | 5/2017 |
| CN | 304683512 | S | 6/2018 |
| CN | 304683632 | S | 6/2018 |
| CN | 108400924 | A | 8/2018 |
| CN | 109714252 | A | 5/2019 |
| KR | 101744071 | B1 | 6/2017 |
| TW | 201830987 | A | 8/2018 |
| WO | 2018/141224 | A1 | 8/2018 |

OTHER PUBLICATIONS

Chinese Patent Application No. 201811634964.6, First Office Action and Search Report dated Aug. 15, 2019, 15 pages with English Translation.
Chinese Patent Application No. 201811634964.6, Second Office Action dated Oct. 28, 2019, 13 pages with English Translation.
Chinese Patent Application No. 201811634964.6, Rejection Decision dated Mar. 25, 2020, 5 pages with English Translation.
Chinese Patent Application No. 201811634964.6, Notification of Reexamination dated Jan. 19, 2021, 8 Pages with English Translation.
"Design of Enterprise Instant Messaging System Based on JMS" China Academic Journal Electronic Publishing House, Website: http://www.cnki.net, pp. 107-108, with English Abstract.
"The Application of Instant Messaging Software in the Work of College Counselors: Taking Dingding as an Example" Journal of Chuzhou Vocational & Technical College, vol. 15 No. 5, Mar. 2017, pp. 38-40 with English Abstract.
Chinese Patent Application No. 201811634964.6, Reexamination Decision dated Jun. 9, 2021, 11 pages with English Translation.

* cited by examiner

METHOD AND APPARATUS FOR PROMPTING MESSAGE READING STATE, AND ELECTRONIC DEVICE

CROSS-REFERENCE TO RELATED APPLICATION

The present disclosure is a continuation of International Application No. PCT/CN2019/126362, filed on Dec. 18, 2019, which claims priority to Chinese patent Application No. 201811634964.6, titled "METHOD AND APPARATUS FOR PROMPTING READING STATE of MESSAGE, AND ELECTRONIC DEVICE", and filed by Tianjin Bytedance Technology Co., Ltd., on Dec. 29, 2018.

TECHNICAL FIELD

The present disclosure relates to the field of message processing technologies, and more particularly, to a method and apparatus for prompting a reading state of a message, and an electronic device.

BACKGROUND

With the development of computer technologies, network-based message interaction has become increasingly popular. A platform for message interaction is a communication product. Once a message is sent, a recipient needs to read the message first, and then give a response accordingly. Such a process is called a dialogue process. When the message is sent to a group of people, a sending end of the message may typically want to know a reading state of the message at a receiving end of the message.

Generally, after sending the message, the sending end of the message cannot know whether it is that the message has been sent but not read by the receiving end of the message, or the message has been sent and read, but not replied to, by the receiving end of the message. Since a user at the sending end of the message cannot know a reading situation of the message sent, misunderstandings in communication may often occur, which in turn may lead to low communication efficiency.

SUMMARY

The present disclosure provides a method and apparatus for prompting a reading state of a message, and an electronic device, capable of solving a technical problem in the related art that due to lack of feedback on a receiving situation of a sent message, a sending end is not aware of the receiving situation of the sent message, which is not desired for communication between the two communicating parties and may even cause misunderstanding.

According to an embodiment in an aspect of the present disclosure, a method for prompting a reading state of a message is provided. The method includes: displaying, when a message having a reading state to be identified is sent in a conversation window including a plurality of users, a reading state prompt pattern corresponding to the message in the conversation window; determining current reading states of respective ones of the plurality of users for the message; counting a current number of users who have read the message based on the reading states; and controlling the reading state prompt pattern to be displayed in a state that reflects the current number of users who have read the message.

According to an embodiment in another aspect of the present disclosure, an apparatus for prompting a reading state of a message is provided. The apparatus includes: a display module configured to display, when a message having a reading state to be identified is sent in a conversation window including a plurality of users, a reading state prompt pattern corresponding to the message in the conversation window; a determining module configured to determine current reading states of respective ones of the plurality of users for the message; a counting module configured to count a current number of users who have read the message based on the reading states; and a reading state display module configured to control the reading state prompt pattern to be displayed in a state that reflects the current number of users who have read the message.

According to an embodiment in yet another aspect of the present disclosure, an electronic device is provided. The electronic device includes at least one processor and a memory communicatively connected to the at least one processor. The memory stores instructions executable by the at least one processor. The instructions are configured to implement the method for prompting a reading state of a message as described in the above embodiment.

According to an embodiment in still yet another aspect of the present disclosure, a non-transitory computer-readable storage medium is provided. The non-transitory computer-readable storage medium stores computer instructions configured to cause a non-transitory computer to implement the method for prompting a reading state of a message as described in the above embodiment.

The technical solution according to an embodiment of the present disclosure may include the following advantageous effects.

When a message having a reading state to be identified is sent in a conversation window including a plurality of users, a reading state prompt pattern corresponding to the message is displayed in the conversation window. Current reading states of respective ones of the plurality of users for the message are determined. A current number of users who have read the message is counted based on the reading states. Then, the reading state prompt pattern is controlled to be displayed in a state that reflects the current number of users who have read the message. In this way, a situation of the message being read in a current conversation scenario may be displayed intuitively, thereby improving the efficiency of learning the reading state of the message, facilitating communication between users at a sending end and a receiving end of the message, and improving the adhesiveness of the users to the product.

Additional aspects and advantages of the present disclosure will be given at least in part in the following description, or become apparent at least in part from the following description, or can be learned from practicing of the present disclosure.

BRIEF DESCRIPTION OF DRAWINGS

The above and/or additional aspects and advantages of the present disclosure will become more apparent and more understandable from the following description of embodiments taken in conjunction with the accompanying drawings, in which.

DESCRIPTION OF EMBODIMENTS

Figure 1:
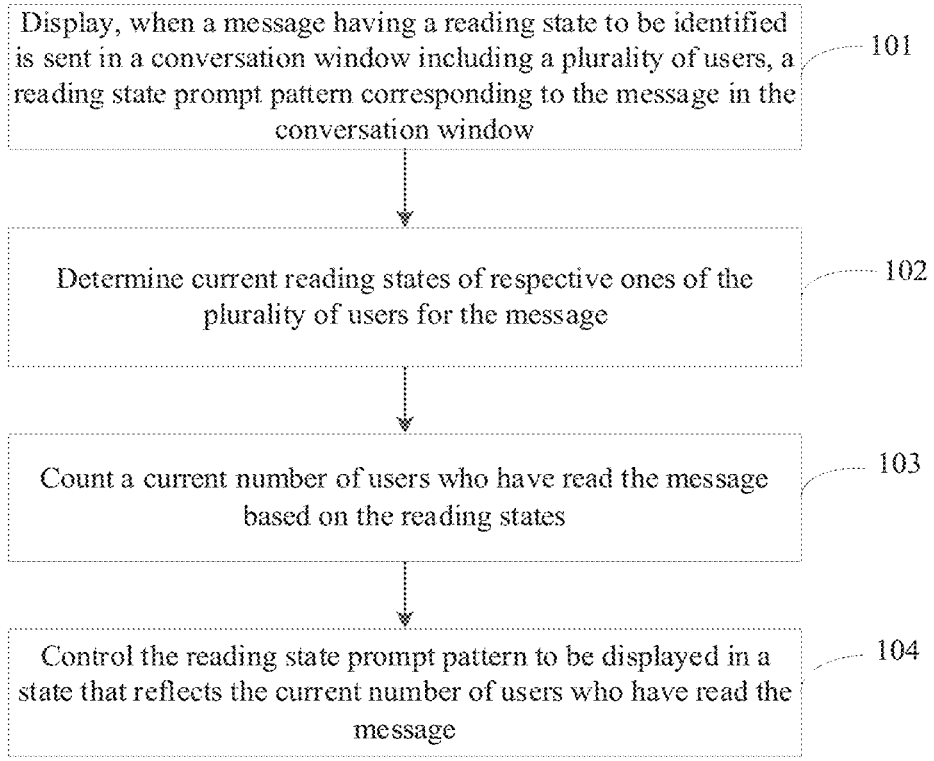
FIG. 1 is a flowchart illustrating a method for prompting a reading state of a message according to an embodiment of the present disclosure.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A method and apparatus for prompting a reading state of a message, and an electronic device according to the embodiments of the present disclosure will be described below with reference to the figures.

It can be seen from the analysis of the above background technology that currently due to lack of feedback on a receiving situation of a sent message, a sending end is not aware of the receiving situation of the sent message, which is not desired for communication between two communication parties, and may even cause misunderstandings. In order to solve this situation, the present disclosure provides a method for prompting a reading state of a message, which collects a reading situation of the sent message and intuitively displays the reading situation to clarify the receiving situation of the message, thereby improving communication efficiency of the communication participants.

It is to be noted that the method for prompting the reading state of the message according to the embodiment of the present disclosure may be applied in a conversation scenario including two or more communication users. The effect of the method is more prominent in the scenario with a plurality of conversation users involved. Thus, the description according to the embodiment of the present disclosure focuses on a case where the conversation scenario includes a plurality of communication users.

Specifically, FIG. 1 is a flowchart illustrating a method for prompting a reading state of a message according to an embodiment of the present disclosure. As illustrated in FIG. 1, the method includes the following steps.

At step 101, when a message having a reading state to be identified is sent in a conversation window including a plurality of users, a reading state prompt pattern corresponding to the message is displayed in the conversation window.

The message having the reading state to be identified may be each most recently sent message, or a message having a reading state as manually selected by a user. In addition, the plurality of users may refer to users other than a user at the sending end in a current conversation scenario.

Specifically, in order to intuitively display a reading state of a message having the reading state to be identified currently to the sending end, the reading state prompt pattern corresponding to the message is displayed in the conversation window. Here, the reading state prompt pattern may be used to prompt a reading situation of the message by the users at receiving ends.

It is to be noted that, according to an embodiment of the present disclosure, the reading state prompt pattern may be displayed only on a conversation interface of the sending end, or may be displayed on conversation interfaces of all users.

Figure 2A:
FIG. 2A is a schematic diagram showing a reading state prompt pattern according to an embodiment of the present disclosure.
Figure 2B:
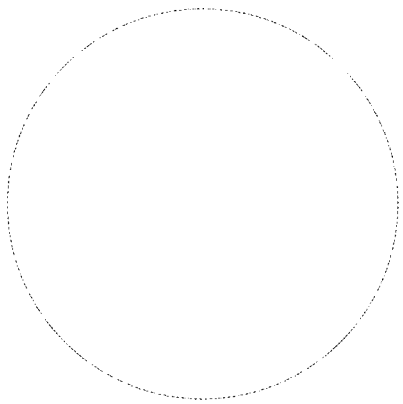
FIG. 2B is a schematic diagram showing a reading state prompt pattern according to another embodiment of the present disclosure.
Figure 2C:
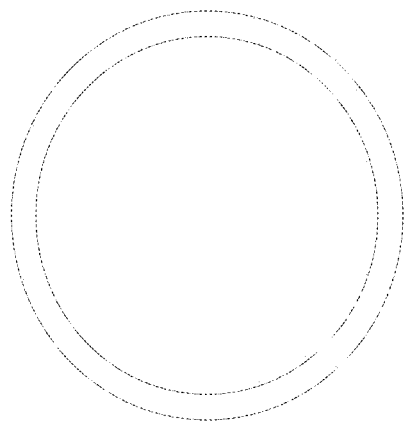
FIG. 2C is a schematic diagram showing a reading state prompt pattern according to yet another embodiment of the present disclosure.

In different application scenarios, the reading state prompt patterns may be represented in different shapes. As a possible implementation, as illustrated in FIG. 2A, a progress bar can be used as the reading state prompt pattern. As illustrated in FIG. 2B, a circular pattern can be used as the reading state prompt pattern. As illustrated in FIG. 2C, an annular pattern can be used as the reading state prompt pattern, etc.

At step 102, current reading states of respective ones of the plurality of users for the message are determined.

It can be appreciated that in different application scenarios, the reading states of the respective users may be obtained differently. As a possible implementation, it can be determined whether the message has been completely displayed in the conversation window of each user currently. If the message has been completely displayed, the message may be determined to have been read. If the message is displayed incompletely or not displayed at all, the message may be determined to have not been read. As another possible implementation, it can be determined whether each user has sent a message in the current conversation scenario within a predetermined time period after the message is sent. If so, the user may be considered to have read the message.

Figure 3:
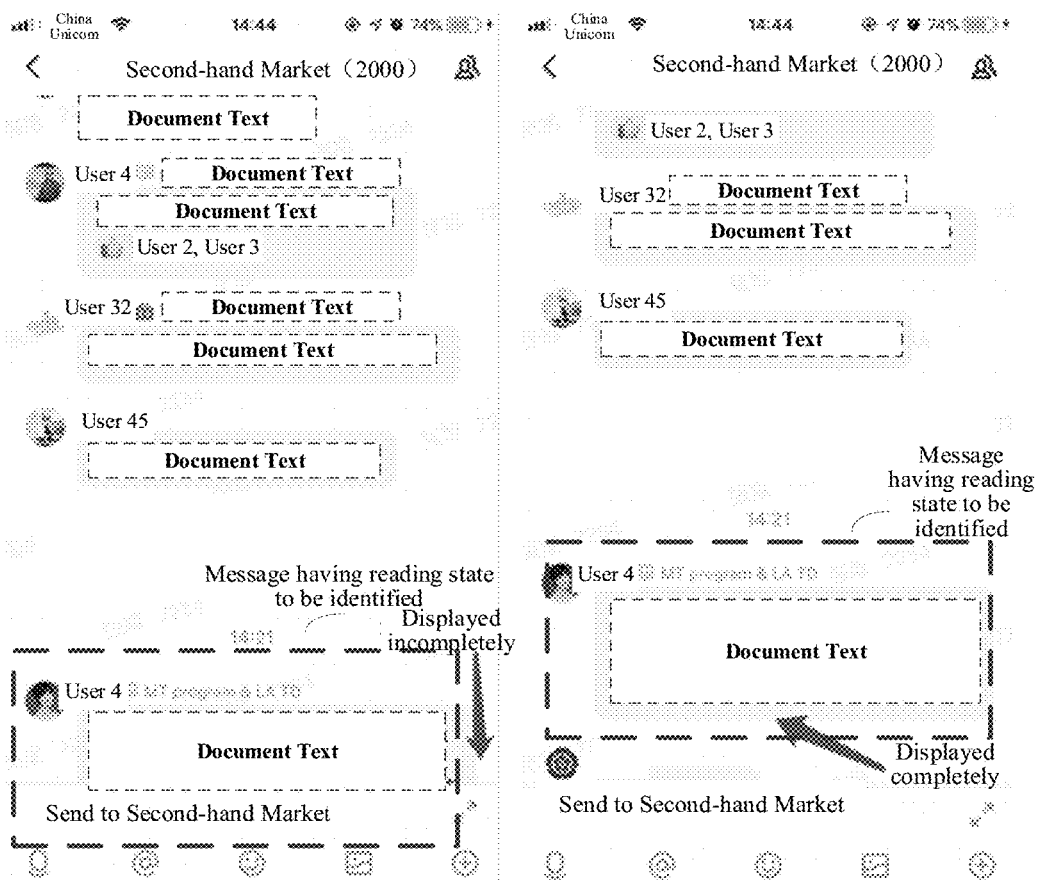
FIG. 3 is a schematic diagram showing a conversation interface displaying messages according to an embodiment of the present disclosure.

For example, when the message having the reading state to be identified is a most recently received message, as illustrated in a left part of FIG. 3, it can be considered that a user corresponding to the current conversation window has not read the message when the message is displayed incompletely, or as illustrated in a right part of FIG. 3, when the message is displayed completely, it can be considered that the user corresponding to the current conversation window has read the message.

At step 103, a current number of users who have read the message is counted based on the reading states.

At step 104, the reading state prompt pattern is controlled be displayed in a state that reflects the current number of users who have read the message.

Specifically, the current number of the users who have read the message may be counted based on the reading states, so as to control the reading state prompt pattern to be displayed in a state that reflects the current number of the users who have read the message. That is, the user at the sending end may intuitively obtain a situation of users who have read the message based on a current state in which the reading state prompt pattern is displayed.

As a possible implementation, the current number of the users who have read the message may be reflected based on a color and a change region of the reading state prompt pattern. That is, a pattern display color and a pattern change region corresponding to the current number of users who have read the message may be determined, and the pattern change region may be controlled to be displayed with a color change corresponding to the pattern display color. It can be appreciated that a region with a color change may correspond to a reading event, and the pattern change region may correspond to the number of users who have read the message. It can be appreciated that the entire region of the reading state prompt pattern represents a total number of the plurality of users.

Figure 4A:
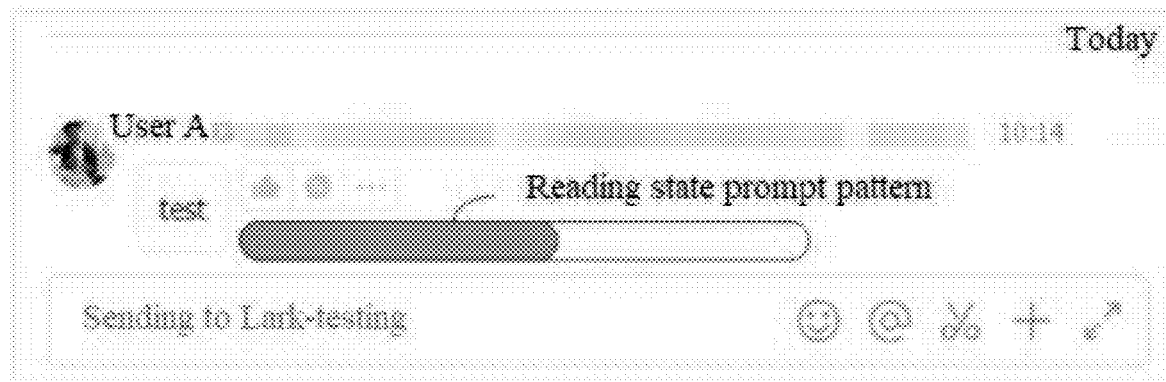
FIG. 4A is a schematic diagram showing a prompting interface of a reading state of a message according to an embodiment of the present disclosure.

For example, when the number of the plurality of users is 10 and the current number of users who have read the message is 5, if the reading state prompt pattern is the progress bar illustrated in FIG. 2A, for a message sent by a user "User A", it can be determined that the pattern display color corresponding to the current number of users who have read the message may be green (indicated by gray in the figure) and the pattern change region may be a region from a start point to a middle point of the progress bar, and thus, the first half of the progress bar may be controlled to be filled with green, as shown in FIG. 4A. In this way, the current reading state of the message sent by the user "User A" may be displayed intuitively.

Figure 4B:
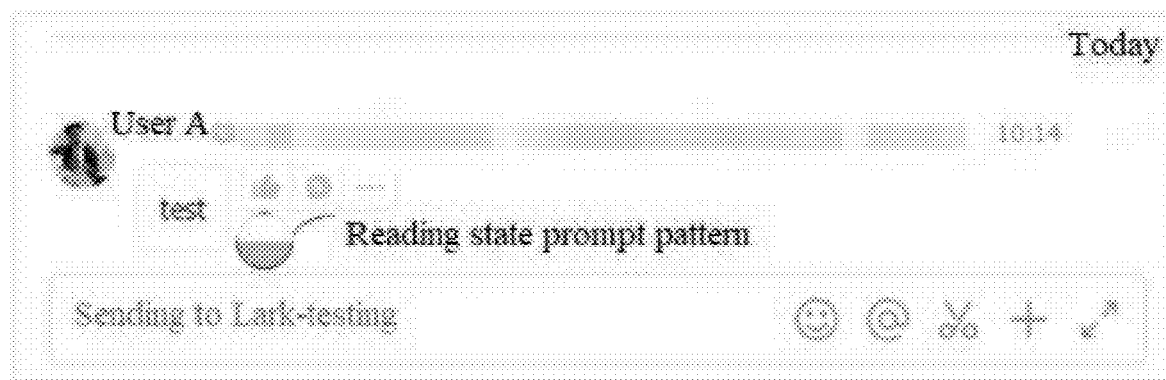
FIG. 4B is a schematic diagram showing a prompting interface of a reading state of a message according to another embodiment of the present disclosure.

For example, when the number of the plurality of users is 10 and the current number of users who have read the message is 5, if the reading state prompt pattern is the circular pattern illustrated in FIG. 2B, for a message sent by the user "User A", it can be determined that the pattern display color corresponding to the current number of users who have read the message may be green (indicated by gray in the figure) and the pattern change region may be a region from the bottom to the center point of the circular pattern, and thus, the lower half of the circular pattern may be controlled to be filled with green, as illustrated in FIG. 4B. In this way, the current reading state of the message sent by the user "User A" may be displayed intuitively.

Figure 4C:
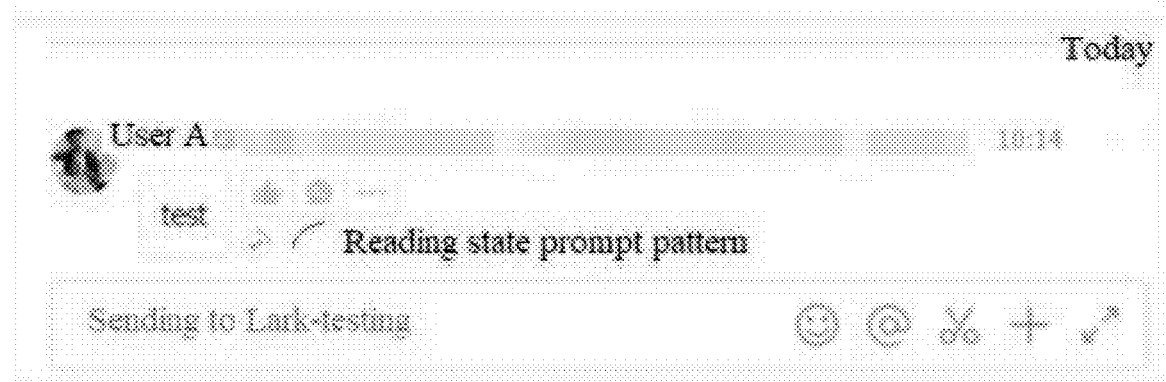
FIG. 4C is a schematic diagram showing a prompting interface of a reading state of a message according to yet another embodiment of the present disclosure.

For example, when the reading state prompt pattern is the annular pattern illustrated in FIG. 2C, for a message sent by the user "User A", when the number of the plurality of users is 4, and the current number of users who have read the message is 1, it can be determined that the pattern display color corresponding to the current number of users who have read the message is green (indicated by gray in the figure) and the pattern change region may be an annular region from a vertex region of a circular pattern to a region where the vertex region is turned by a center angle of 90 degrees clockwise, and thus, a region with the center angle of 90 degrees in the upper right portion of the annular pattern may be controlled to be filled with green, as illustrated in FIG. 4C. In this way, the current reading state of the message sent by the user "User A" may be displayed intuitively.

In an embodiment, in order to further clarify the number of users who have read the message, a check mark can be displayed at the center of the annular region. When there is a user who has read the message, the check mark is filled with green (indicated by gray in FIG. 4C). When no user has read the message, the check mark is not filled with color.

In an embodiment of the present disclosure, in order to further clarify the reading situation of the plurality of users for the message, the reading situation of the plurality of users for the message may also be displayed in a form of a list.

Specifically, in an embodiment of the present disclosure, a trigger operation, such as a single-click operation, a double-click operation, etc., performed by the user on the reading state prompt pattern may be obtained, and a list of users who have read the message and a list of users who have not read the message corresponding to the message may be displayed based on the trigger operation.

Figure 5:
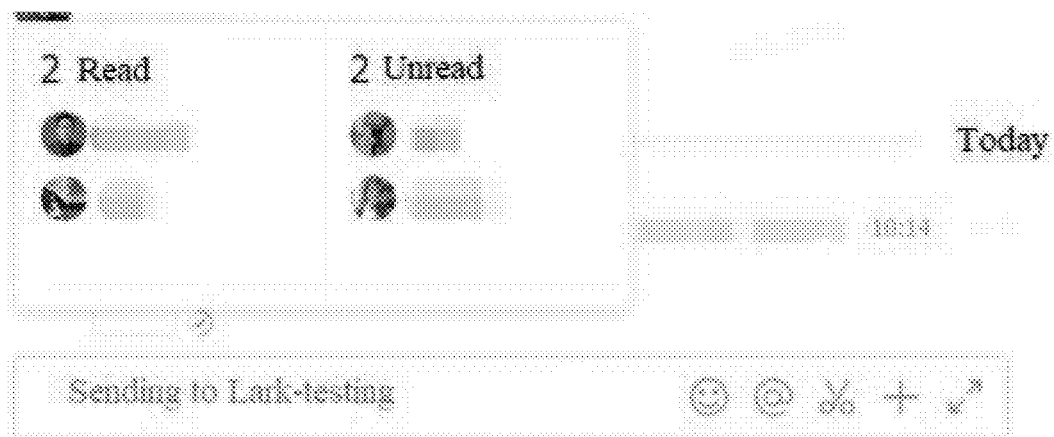
FIG. 5 is a schematic diagram showing a prompting interface of a reading state of a message according to still yet another embodiment of the present disclosure.

For example, as illustrated in FIG. 5, when the reading state prompt pattern is the annular pattern with the check mark in the middle as illustrated in FIG. 4C, the list of users who have read the message and the list of users who have not read the message may be displayed after the trigger operation of the user is obtained.

In an embodiment, in order to further clarify the reading situation, the users in the list of users who have read the message may also be sorted based on reading time. That is, the reading time of respective ones of the plurality of users who have read the message is obtained. For example, the time when the message is completely displayed on conversation interfaces corresponding to the respective users can be obtained. In the list of users who have read the message, the plurality of users who have read the message can be sorted in a chronological order of their reading time, and the sorted list of users who have read the message can be displayed. The list of users who have read the message may contain nicknames and/or avatars of the users.

Figure 6:
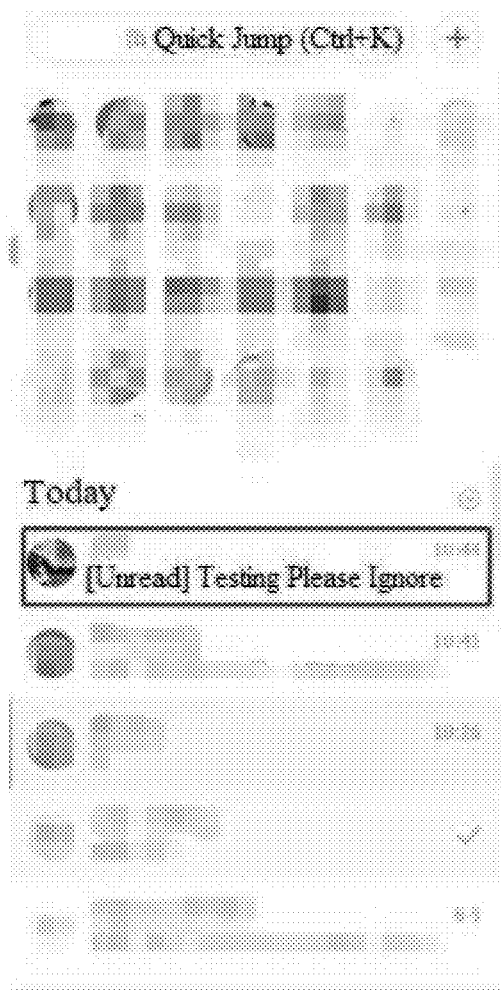
FIG. 6 is a schematic diagram showing a prompting interface of a reading state of a message according to still yet another embodiment of the present disclosure.

In addition, in a conversation scenario involving two persons, the reading state of the message may be directly associated with the corresponding user at the receiving end. Thus, in the conversation scenario involving two persons as illustrated in FIG. 6, the corresponding reading state of the message may be directly displayed in a conversation list without entering the conversation scenario.

In summary, with the method for prompting a reading state of a message according to the embodiment of the present disclosure, when a message having a reading state to be identified is sent in a conversation window including a plurality of users, a reading state prompt pattern corresponding to the message is displayed in the conversation window. Current reading states of respective ones of the plurality of users for the message are determined. A current number of users who have read the message is counted based on the reading states. Then, the reading state prompt pattern is controlled to be displayed in a state that reflects the current number of users who have read the message. In this way, a situation of the message being read in a current conversation scenario may be displayed intuitively, thereby improving the efficiency of learning the reading state of the message, facilitating communication between users at a sending end and a receiving end of the message, and improving the adhesiveness of the users to the product.

To implement the above embodiments, the present disclosure further provides an apparatus for prompting a reading state of a message.

Figure 7:
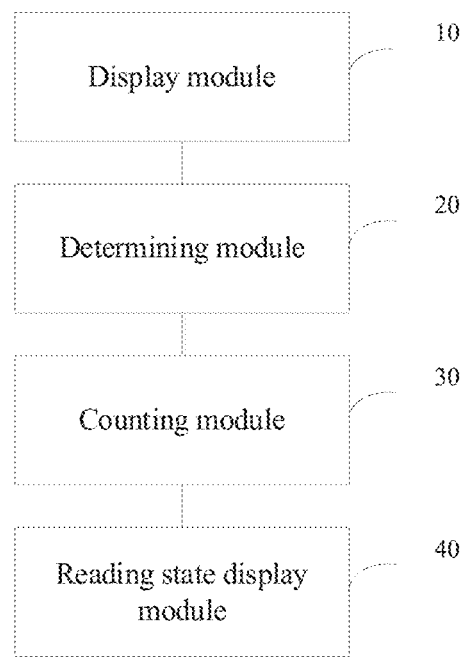
FIG. 7 is a block diagram showing a structure of an apparatus for prompting a reading state of a message according to an embodiment of the present disclosure.

FIG. 7 is a schematic diagram showing an apparatus for prompting a reading state of a message according to an embodiment of the present disclosure. As illustrated in FIG. 7, the apparatus for prompting the reading state of the message includes a display module 10, a determining module 20, a counting module 30, and a reading state display module 40.

The display module 10 is configured to display, when a message having a reading state to be identified is sent in a conversation window including a plurality of users, a reading state prompt pattern corresponding to the message in the conversation window.

The determination module 20 is configured to determine current reading states of respective ones of the plurality of users for the message.

In an embodiment of the present disclosure, the determination module 20 can be configured to: determine whether the message has been completely displayed in a receiving-end conversation window of each of the plurality of users; determine that any of the plurality of users has read the message when the message has been completely displayed in the receiving-end conversation window of that user; and determine that any of the plurality of users has not read the message when the message has not been completely displayed in the receiving-end conversation window of that user.

The counting module 30 is configured to count a current number of users who have read the message based on the reading states.

The reading state display module 40 is configured to control the reading state prompt pattern to be displayed in a state that reflects the current number of users who have read the message.

In an embodiment of the present disclosure, the reading state display module 40 can be configured to: determine a pattern display color and a pattern change region corresponding to the current number of users who have read the message; and control the pattern change region to be displayed with a color change corresponding to the pattern display color.

Figure 8:
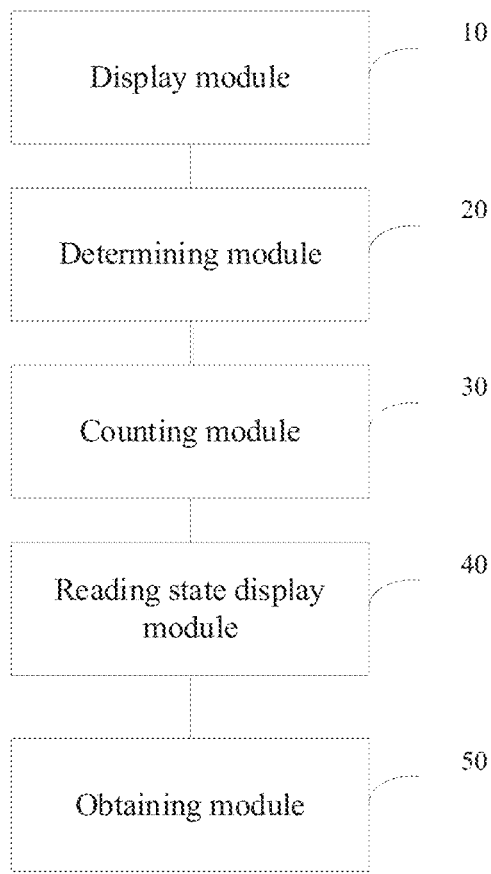
FIG. 8 is a block diagram showing a structure of an apparatus for prompting a reading state of a message according to another embodiment of the present disclosure.

In an embodiment of the present disclosure, on the basis of FIG. 7, the apparatus can further include an obtaining module 50, as illustrated in FIG. 8. The obtaining module 50 is configured to obtain a trigger operation on the reading state prompt pattern.

The reading state display module 40 can be further configured to display a list of users who have read the message and a list of users who have not read the message corresponding to the message in accordance with the trigger operation.

Figure 9:
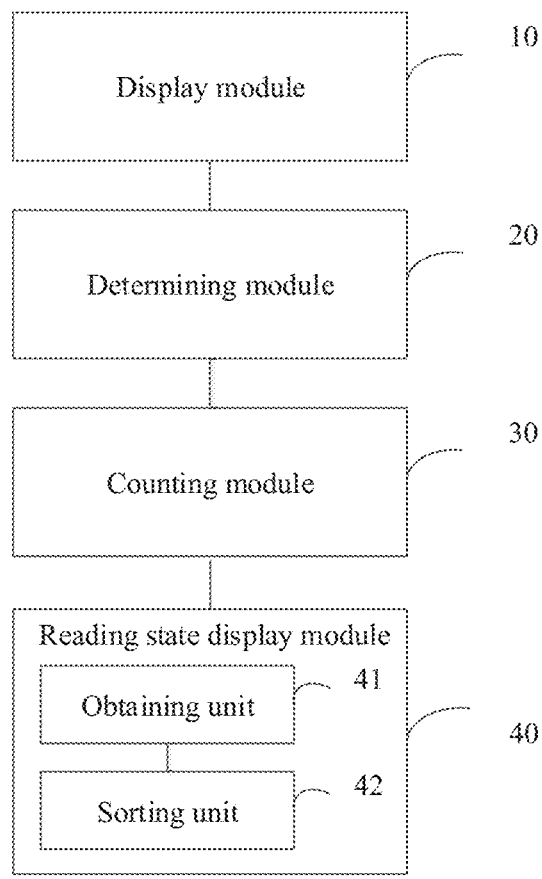
FIG. 9 is a block diagram showing a structure of an apparatus for prompting a reading state of a message according to yet another embodiment of the present disclosure.

In an embodiment of the present disclosure, on the basis of FIG. 7, the reading state display module 40 includes an obtaining unit 41 and a sorting unit 42, as illustrated in FIG. 9.

The obtaining unit 41 is configured to obtain reading time of respective ones of the plurality of users who have read the message.

The sorting unit 42 is configured to sort, in the list of users who have read the message, the plurality of users who have read the message in a chronological order of their reading time, and displaying the sorted list of users who have read the message.

It is to be noted that the above description of the method for prompting the reading state of the message is also applicable to the apparatus for prompting the reading state of the message according to the embodiment, and details thereof will be omitted here.

In summary, with the apparatus for prompting a reading state of a message according to the embodiment of the present disclosure, when a message having a reading state to be identified is sent in a conversation window including a plurality of users, a reading state prompt pattern corresponding to the message is displayed in the conversation window. Current reading states of respective ones of the plurality of users for the message are determined. A current number of users who have read the message is counted based on the reading states. Then, the reading state prompt pattern is controlled to be displayed in a state that reflects the current number of users who have read the message. In this way, a situation of the message being read in a current conversation scenario may be displayed intuitively, thereby improving the efficiency of learning the reading state of the message, facilitating communication between users at a sending end and a receiving end of the message, and improving the adhesiveness of the users to the product.

To implement the above embodiments, the present disclosure also provides an electronic device. The electronic device includes at least one processor and a memory communicatively connected to the at least one processor.

The memory stores instructions executable by the at least one processor. The instructions are configured to implement the method for prompting the reading state of the message according to the above embodiments.

Figure 10:
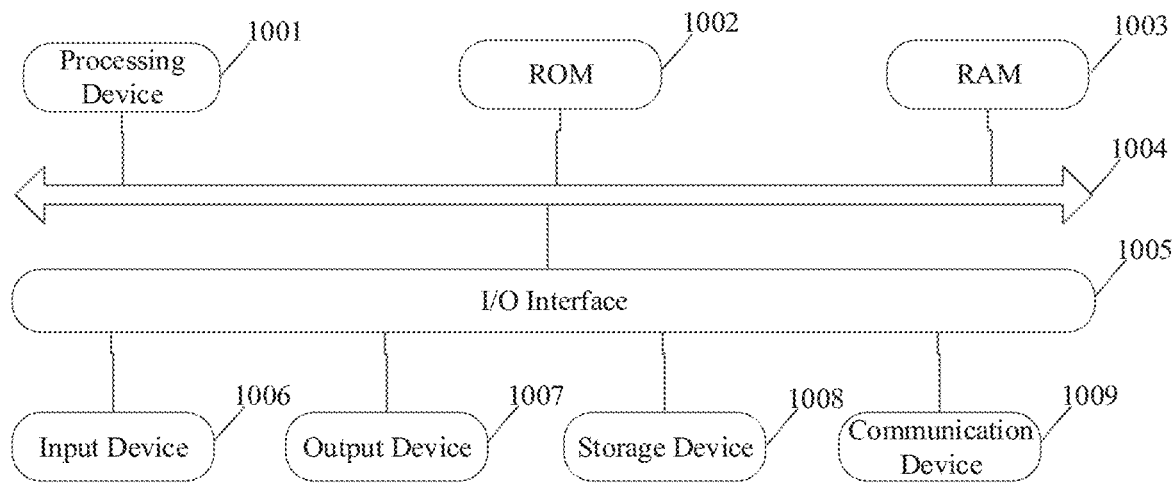
FIG. 10 is a block diagram showing a structure of an electronic device suitable for implementing an embodiment of the present disclosure.

Reference is now made to FIG. 10, which is a schematic diagram showing an electronic device suitable for implementing the embodiments of the present disclosure. The electronic device according to the embodiment of the present disclosure may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 10 is exemplary only, and should not be construed as limiting the function and scope of use of the embodiments of the present disclosure.

As illustrated in FIG. 10, the electronic device may include a processing device (such as a central processing unit, a graphics processing unit, etc.) 1001, which may perform various appropriate actions and processes in accordance with programs stored in a Read Only Memory (ROM) 1002 or loaded from a storage device 1008 into a Random Access Memory (RAM) 1003. In the RAM 1003, various programs and data required for operation of the electronic device may also be stored. The processing device 1001, the ROM 1002, and the RAM 1003 are connected to each other through a bus 1004. An Input/Output (I/O) interface 1005 is also connected to the bus 1004.

Generally, the following devices may be connected to the I/O interface 1005: an input device 1006 including, for example, a touch screen, a touch pad, a keyboard, a mouse, a camera, a microphone, an accelerometer, a gyroscope, etc.; an output device 1007 including, for example, a Liquid Crystal Display (LCD), a speaker, an oscillator, etc.; the storage device 1008 including, for example, a magnetic tape or a hard disk; and a communication device 1009. The communication device 1009 may allow the electronic device to perform wireless or wired communication with other devices for data exchange. Although FIG. 10 illustrates the electronic device having various devices, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication device 1009, or installed from the storage device 1008, or installed from the ROM 1002. When the computer program is executed by the processing device 1001, the above-mentioned functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes stored on the computer-readable medium may be transmitted via any appropriate medium, including but not limited to electric cable, optical cable, Radio Frequency (RF), or any suitable combination thereof.

The above computer-readable medium may be included in the above electronic device; or may be standalone without being assembled into the electronic device.

The above computer-readable medium may carry one or more programs which, when executed by the electronic device, cause the electronic device to: display, when a message having a reading state to be identified is sent in a conversation window including a plurality of users, a reading state prompt pattern corresponding to the message in the conversation window; determine current reading states of respective ones of the plurality of users for the message; count a current number of users who have read the message based on the reading states; and control the reading state prompt pattern to be displayed in a state that reflects the current number of users who have read the message.

Alternatively, the above computer-readable medium may carry one or more programs which, when executed by the electronic device, cause the electronic device to: display, when a message having a reading state to be identified is sent in a conversation window including a plurality of users, a reading state prompt pattern corresponding to the message in the conversation window; determine current reading states of respective ones of the plurality of users for the message; count a current number of users who have read the message based on the reading states; and control the reading state prompt pattern to be displayed in a state that reflects the current number of users who have read the message.

The computer program code for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Units involved and described in the embodiments of the present disclosure may be implemented in software or hardware. A name of a unit does not constitute a limitation on the unit itself under certain circumstances.

To implement the above embodiments, the present disclosure also provides a non-transitory computer-readable storage medium. The non-transitory computer-readable storage medium stores computer instructions configured to cause a computer to implement the method for prompting a reading state of a message as described in the above embodiments.

Figure 11:
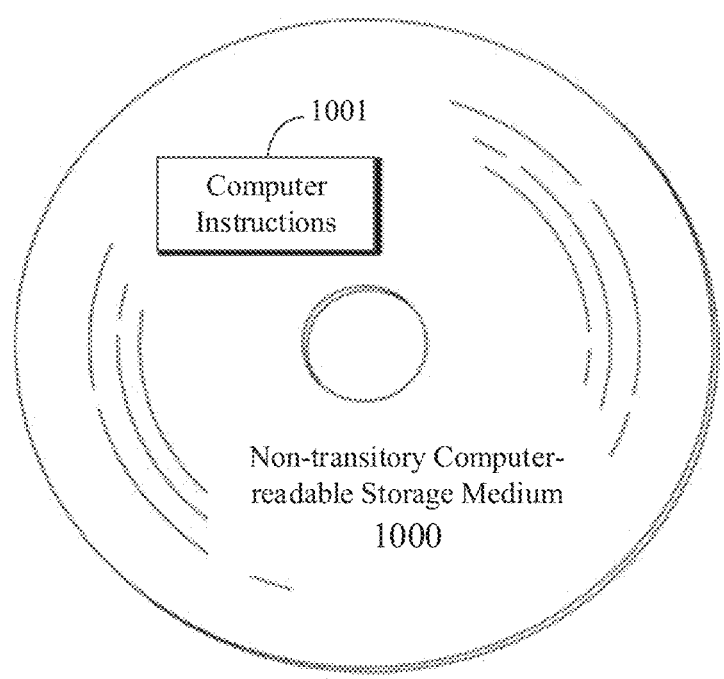
FIG. 11 is a schematic diagram showing a non-transitory computer-readable storage medium according to an embodiment of the present disclosure.

FIG. 11 is a schematic diagram showing a non-transitory computer-readable storage medium according to an embodiment of the present disclosure. As illustrated in FIG. 11, a non-transitory computer-readable storage medium 1000 according to the embodiment of the present disclosure has computer instructions 1001 stored thereon. The computer instructions 1001, when executed by a processor, implements all or part of the steps of the method for prompting a reading state of a message according to the above embodiments of the present disclosure.

From the description of the above embodiments, those skilled in the art can clearly understand that each embodiment can be implemented in software in conjunction with a necessary general hardware platform, or alternatively in hardware of course. Based on this understanding, the above technical solution essentially or a part of the above technical solution that contributes to the related art can be embodied in a form of a software product. The computer software product can be stored in a non-transitory storage medium, such as a magnetic disk, an optical disc, a Read-Only Storage Memory (ROM) or a Random Storage Memory (RAM), etc., and may include instructions to cause a computer device (which can be a personal computer, a service end, or a network device, etc.) to implement the methods according to various embodiments or some parts thereof.

Finally, it is to be noted that the above embodiments are only provided to illustrate, rather than limiting, the technical solutions of the present disclosure. Although the present disclosure has been described in detail with reference to the above embodiments, it can be appreciated by those skilled in the art that the technical solutions recorded in the above embodiments can be modified, or some of the technical features thereof can be replaced with alternatives, without departing from the spirit and scope of the technical solutions according to various embodiments of the present disclosure.

What is claimed is:

1. A method for prompting a reading state of a message, comprising steps of:
    displaying, when a message having a reading state to be identified is sent in a conversation window including a plurality of users, a reading state prompt pattern corresponding to the message in the conversation window;
    determining current reading states of respective ones of the plurality of users for the message;
    counting a current number of users who have read the message based on the reading states;
    controlling the reading state prompt pattern to be displayed in a state that reflects the current number of users who have read the message by:
        determining a pattern display color and a pattern change region of the reading state prompt pattern corresponding to the current number of users who have read the message; and
        controlling the pattern change region to be displayed with a color change corresponding to the pattern display color, and
    providing the reading state prompt pattern as one of:
        a progress bar, wherein the pattern display color is a fill color of the progress bar and the pattern change region is a fill region of the progress bar;
        a circular pattern, wherein the pattern change region is a region extending from a bottom towards a center of the circular pattern and the pattern display color is a fill color of the circular pattern; and
        an annular pattern containing a check mark, wherein the pattern change region includes a fill region of the annular pattern extending clockwise and a fill region of the check mark, and the pattern display color is a fill color of the check mark and the annular pattern.

2. The method of claim 1, further comprising:
    obtaining a trigger operation on the reading state prompt pattern; and
    displaying a list of users who have read the message and a list of users who have not read the message corresponding to the message in accordance with the trigger operation.

3. The method of claim 2, wherein when the list of users who have read the message comprises a plurality of users who have read the message, said displaying the list of users who have read the message corresponding to the message in accordance with the trigger operation comprises:
    obtaining reading time of respective ones of the plurality of users who have read the message; and
    sorting, in the list of users who have read the message, the plurality of users who have read the message in a chronological order of their reading time, and displaying the sorted list of users who have read the message.

4. The method of claim 1, wherein said determining current reading states of respective ones of the plurality of users for the message comprises:
    determining whether the message has been completely displayed in a receiving-end conversation window of each of the plurality of users;
    determining that any of the plurality of users has read the message when the message has been completely displayed in the receiving-end conversation window of that user; and
    determining that any of the plurality of users has not read the message when the message has not been completely displayed in the receiving-end conversation window of that user.

5. The method of claim 1, wherein said determining current reading states of respective ones of the plurality of users for the message comprises:
    determining whether any of the plurality of users has sent a message in a current conversation scenario within a predetermined time period after the message is sent;
    determining that the user has read the message when the message has been sent within the predetermined time period; and
    determining that the user has not read the message when the message has not been sent within the predetermined time period.

6. An apparatus for prompting a reading state of a message, comprising:
    a display module configured to display, when a message having a reading state to be identified is sent in a conversation window including a plurality of users, a reading state prompt pattern corresponding to the message in the conversation window, wherein:
        when the reading state prompt pattern is a progress bar, the pattern display color is a fill color of the progress bar and the pattern change region is a fill region of the progress bar;
        when the reading state prompt pattern is a circular pattern, the pattern change region is a region extending from a bottom towards a center of the circular pattern and the pattern display color is a fill color of the circular pattern; and
        when the reading state prompt pattern is an annular pattern containing a check mark, the pattern change region includes a fill region of the annular pattern extending clockwise and a fill region of the check mark, and the pattern display color is a fill color of the check mark and the annular pattern;

a determining module configured to determine current reading states of respective ones of the plurality of users for the message;

a counting module configured to count a current number of users who have read the message based on the reading states; and a reading state display module configured to control the reading state prompt pattern to be displayed in a state that reflects the current number of users who have read the message, wherein the reading state display module is configured to:

determine a pattern display color and a pattern change region corresponding to the current number of users who have read the message; and control the pattern change region to be displayed with a color change corresponding to the pattern display color.

7. The apparatus of claim 6, further comprising:

an obtaining module configured to obtain a trigger operation on the reading state prompt pattern, wherein the reading state display module is further configured to display a list of users who have read the message and a list of users who have not read the message corresponding to the message in accordance with the trigger operation.

8. An electronic device, comprising:

at least one processor and a memory communicatively connected to the at least one processor, wherein the memory stores instructions that, when executed by the at least one processor, cause the electronic device to:

display, when a message having a reading state to be identified is sent in a conversation window including a plurality of users, a reading state prompt pattern corresponding to the message in the conversation window;

determine current reading states of respective ones of the plurality of users for the message;

count a current number of users who have read the message based on the reading states;

control the reading state prompt pattern to be displayed in a state that reflects the current number of users who have read the message by:

determining a pattern display color and a pattern change region of the reading state prompt pattern corresponding to the current number of users who have read the message; and controlling the pattern change region to be displayed with a color change corresponding to the pattern display color, and provide the reading state prompt pattern as one of:

a progress bar, wherein the pattern display color is a fill color of the progress bar and the pattern change region is a fill region of the progress bar;

a circular pattern, wherein the pattern change region is a region extending from a bottom towards a center of the circular pattern and the pattern display color is a fill color of the circular pattern; and an annular pattern containing a check mark, wherein the pattern change region includes a fill region of the annular pattern extending clockwise and a fill region of the check mark, and the pattern display color is a fill color of the check mark and the annular pattern.

9. A non-transitory computer-readable storage medium, storing computer instructions configured to cause a computer to implement the method for prompting a reading state of a message comprising:

displaying, when a message having a reading state to be identified is sent in a conversation window including a plurality of users, a reading state prompt pattern corresponding to the message in the conversation window;

determining current reading states of respective ones of the plurality of users for the message;

counting a current number of users who have read the message based on the reading states; and controlling the reading state prompt pattern to be displayed in a state that reflects the current number of users who have read the message by;

determining a pattern display color and a pattern change region of the reading state prompt pattern corresponding to the current number of users who have read the message; and controlling the pattern change region to be displayed with a color change corresponding to the pattern display color, and providing the reading state prompt pattern as one of:

a progress bar, wherein the pattern display color is a fill color of the progress bar and the pattern change region is a fill region of the progress bar;

a circular pattern, wherein the pattern change region is a region extending from a bottom towards a center of the circular pattern and the pattern display color is a fill color of the circular pattern; and an annular pattern containing a check mark, wherein the pattern change region includes a fill region of the annular pattern extending clockwise and a fill region of the check mark, and the pattern display color is a fill color of the check mark and the annular pattern.

* * * * *